(12) United States Patent
Brown et al.

(10) Patent No.: US 8,924,559 B2
(45) Date of Patent: Dec. 30, 2014

(54) PROVISIONING SERVICES USING A CLOUD SERVICES CATALOG

(75) Inventors: Gene L. Brown, Southbury, CT (US); Brendan F. Coffey, Durham, NY (US); Christopher J. Dawson, Arlington, VA (US); Rick A. Hamilton, II, Charlottesville, VA (US); Mahesh Viswanathan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 12 days.

(21) Appl. No.: 12/630,049

(22) Filed: Dec. 3, 2009

(65) Prior Publication Data

US 2011/0138047 A1     Jun. 9, 2011

(51) Int. Cl.
- *G06F 15/173* (2006.01)
- *G06F 9/50* (2006.01)
- *G06Q 10/10* (2012.01)

(52) U.S. Cl.
CPC .............. *G06F 9/5072* (2013.01); *G06Q 10/10* (2013.01)
USPC ........................... 709/226; 709/223; 709/225

(58) Field of Classification Search
USPC ........................................ 709/223, 225, 226
See application file for complete search history.

(56) References Cited

U.S. PATENT DOCUMENTS

| | | | |
|---|---|---|---|
| 6,931,440 B1 | 8/2005 | Blumenau et al. | |
| 7,200,657 B2 | 4/2007 | Adams et al. | |
| 2004/0177057 A1 | 9/2004 | Fairchild et al. | |
| 2005/0027863 A1 | 2/2005 | Talwar et al. | |
| 2006/0041641 A1 | 2/2006 | Breiter et al. | |
| 2006/0048157 A1 | 3/2006 | Dawson et al. | |
| 2007/0061277 A1 | 3/2007 | Boden et al. | |
| 2008/0034071 A1 | 2/2008 | Wilkinson et al. | |
| 2009/0276771 A1 * | 11/2009 | Nickolov et al. | 717/177 |
| 2009/0299905 A1 * | 12/2009 | Mestha et al. | 705/76 |
| 2010/0003972 A1 * | 1/2010 | Little et al. | 455/418 |
| 2010/0125669 A1 * | 5/2010 | Esfahany et al. | 709/228 |
| 2010/0131624 A1 * | 5/2010 | Ferris | 709/221 |
| 2010/0131649 A1 * | 5/2010 | Ferris | 709/226 |

(Continued)

FOREIGN PATENT DOCUMENTS

EP     PCT2010066763     3/2010

OTHER PUBLICATIONS

Prodan, R. et al., "A Survey and Taxonomy of Infrastructure as a Service and Web Hosting Cloud Providers", 10th IEEE/ACM International Conference on Grid Computing, pp. 17-25.

(Continued)

*Primary Examiner* — Thanh Tammy Nguyen
*Assistant Examiner* — Jonathan Bui
(74) *Attorney, Agent, or Firm* — William E. Schiesser; Keohane & D'Alessandro, PLLC

(57) ABSTRACT

The present invention provides a system and method for provisioning Cloud services by establishing a Cloud services catalog using a Cloud service bus within a Cloud computing environment. In one embodiment, there is a Cloud services catalog manager configured to connect a plurality of Clouds in a Cloud computing environment; maintain a catalog of integrated Cloud services from the plurality of connected Clouds; and display an index of the integrated services on a user interface. Using this system and method will allow for multiple disparate services, offered by different partners, across unrelated, physically distinct Clouds to be presented as an index of integrated services.

20 Claims, 7 Drawing Sheets

(56) References Cited

U.S. PATENT DOCUMENTS

| | | | |
|---|---|---|---|
| 2010/0332262 A1* | 12/2010 | Horvitz et al. | 705/4 |
| 2011/0016214 A1* | 1/2011 | Jackson | 709/226 |
| 2011/0022642 A1* | 1/2011 | deMilo et al. | 707/805 |
| 2011/0138050 A1* | 6/2011 | Dawson et al. | 709/226 |
| 2011/0231899 A1* | 9/2011 | Pulier et al. | 726/1 |
| 2012/0016778 A1* | 1/2012 | Salle et al. | 705/27.1 |

OTHER PUBLICATIONS

Vecchiola, C. et al., "Aneka: A Software Platform for .NET-based Cloud Computing", 30 pages. Source unknown.

Viswanathan, M. et al., "ERMIS: Designing, developing and delivering a remote managed infrastructure services solution", IBM J. Research & Development, vol. 53, No. 6, Paper 82009M, 18 pages.

"Interoperable Clouds", A White Paper from the Open Cloud Standards Incubator, Version 1.0.0, Status: DMTF Informational, Publication Dated: Nov. 11, 2009, Document No. DSP-IS)101, 21 pages.

Mell, P. et al., "The NIST Definition of Cloud Computing", National Institute of Standards and Technology, Information Technology Laboratory, Version 15, Oct. 7, 2009, 2 pages.

Chen Yilan, "Information Materials for IDS", DE Office Action Dated Jul. 9, 2013, 4 pages.

Rodrigo Fernando Flores, "How to Produce an Actionable IT Service Catalog", Jul. 18, 2005, 4 pages.

* cited by examiner

PROVISIONING SERVICES USING A CLOUD SERVICES CATALOG

FIELD OF THE INVENTION

In general, the present invention relates to Cloud computing. Specifically, the present invention relates to provisioning Cloud services by establishing a Cloud services catalog using a Cloud service bus within a Cloud computing environment.

BACKGROUND OF THE INVENTION

Cloud computing has become a popular way to offer various Information Technology (IT) concepts as services. In traditional IT environments, clients have basic expectations around qualities of service. As Cloud computing adoption continues to grow, the same expectations will emerge for services to be broadly available, scalable, and have more dynamic attributes attached to them. To satisfy these requirements, Cloud providers must recognize that existing enterprise service bus designs do not adequately address the scale, heterogeneous participation, and dynamics associated with a mature (i.e., fully developed) Cloud computing services bus model.

SUMMARY OF THE INVENTION

This disclosure describes a system and method for the dynamic generation and maintenance of a Cloud services catalog using a Cloud bus. The Cloud bus allows for multiple disparate services, offered by different partners, across unrelated, physically distinct Clouds to be presented as an index of integrated services.

Among other things, the present invention allows for Cloud providers to: provide a method to establish and mandate a minimum set of attributes required to interoperate with other Cloud services; provide a method to manage the dynamic nature of a Cloud computing environment such that the Cloud services bus can be used to manage the constantly changing nature of Cloud resources and offered services; provide a method to manage and represent constantly changing service levels associated with available Cloud services; and provide a method to allow third party Cloud partners (or Cloud brokers) to create new service catalog entries implemented by multiple back-end Cloud providers.

A first aspect of the present invention provides a method for provisioning services from a plurality of Clouds in a Cloud computing environment, comprising: connecting the plurality of Clouds in a Cloud computing environment; maintaining a catalog of integrated Cloud services from the plurality of connected Clouds; and displaying an index of the integrated services on a user interface.

A second aspect of the present invention provides a Cloud services catalog manager for provisioning services from a plurality Clouds in a Cloud computing environment, comprising; a memory medium comprising instructions; a bus coupled to the memory medium; and a processor coupled to the bus that when executing the instructions causes the Cloud services bus manager to: connect the plurality of Clouds in a Cloud computing environment; maintain a catalog of integrated Cloud services from the plurality of connected Clouds; and display an index of the integrated services on a user interface.

A third aspect of the present invention provides a computer readable medium containing a program product for provisioning services from a plurality of Clouds in a Cloud computing environment, the computer readable medium comprising program code for causing a computer system to: connect the plurality of Clouds in a Cloud computing environment; maintain a catalog of integrated Cloud services from the plurality of connected Clouds; and display an index of the integrated services on a user interface.

A fourth aspect of the present invention provides a method for deploying a system for provisioning services from a plurality of Clouds in a Cloud computing environment, comprising: providing a computer infrastructure being operable to: connect the plurality of Clouds in a Cloud computing environment; maintain a catalog of integrated Cloud services from the plurality of connected Clouds; and display an index of the integrated services on a user interface.

BRIEF DESCRIPTION OF THE DRAWINGS

These and other features of this invention will be more readily understood from the following detailed description of the various aspects of the invention taken in conjunction with the accompanying drawings in which.

Figure 1:
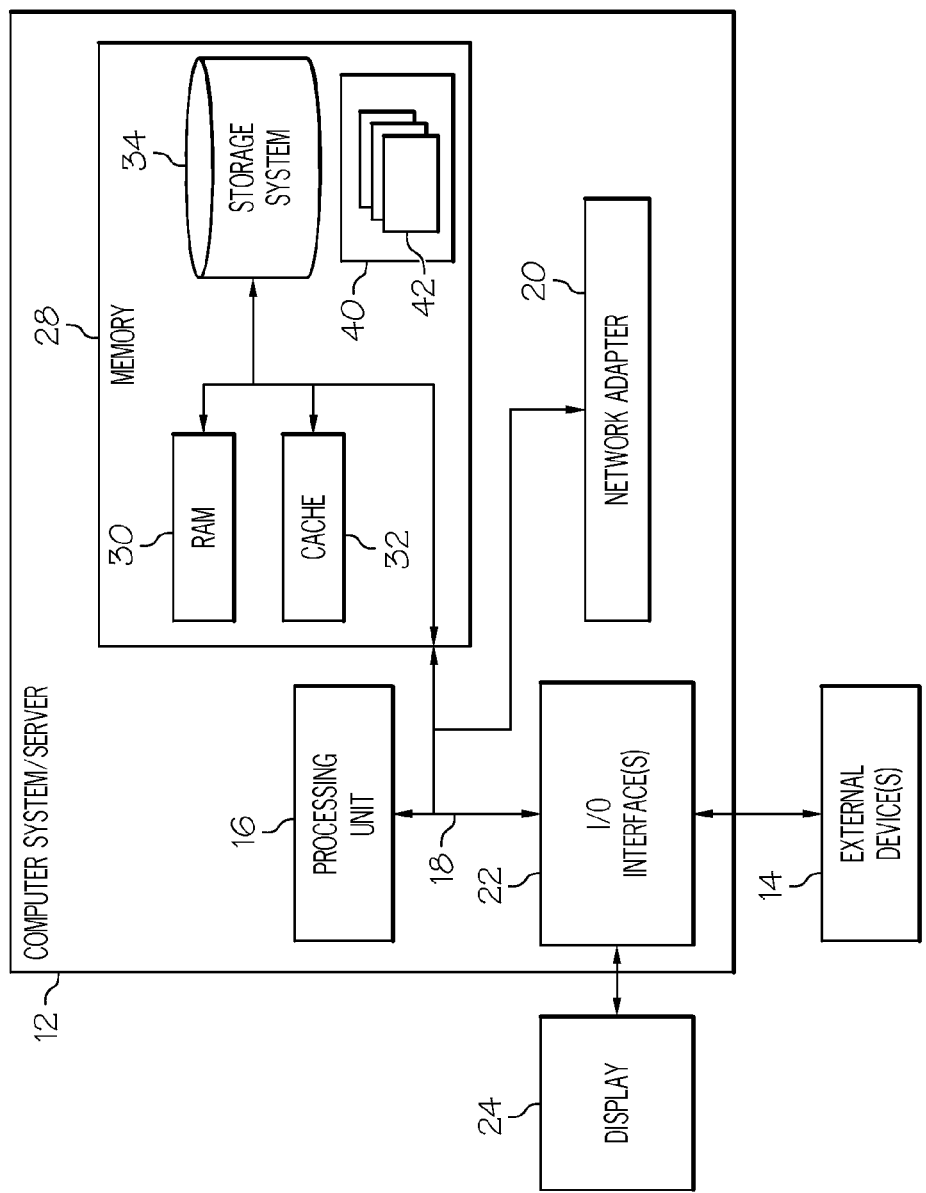
FIG. 1 shows a Cloud system node according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:

I. Cloud Computing Definitions
II. Detailed Implementation of the Invention

I. Cloud Computing Definitions

The following definitions have been derived from the "Draft NIST Working Definition of Cloud Computing" by Peter Mell and Tim Grance, dated Oct. 7, 2009, which is cited on an IDS filed herewith, and a copy of which is attached thereto.

"Cloud computing" is a model for enabling convenient, on-demand network access to a shared pool of configurable computing resources (e.g., networks, servers, storage, applications, and services) that can be rapidly provisioned and released with minimal management effort or service provider interaction. This Cloud model promotes availability and is comprised of at least five characteristics, three service models, and four deployment models. Characteristics are as follows:

On-demand self-service: A consumer can unilaterally provision computing capabilities, such as server time and network storage, as needed automatically without requiring human interaction with each service's provider. Broad network access: Capabilities are available over the network and accessed through standard mechanisms that promote use by heterogeneous thin or thick client platforms (e.g., mobile phones, laptops, and PDAs).

Resource pooling: The provider's computing resources are pooled to serve multiple consumers using a multi-tenant model, with different physical and virtual resources dynamically assigned and reassigned according to consumer demand. There is a sense of location independence in that the customer generally has no control or knowledge over the exact location of the provided resources but may be able to specify location at a higher level of abstraction (e.g., country, state, or datacenter). Examples of resources include storage, processing, memory, network bandwidth, and virtual machines.

Rapid elasticity: Capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Cloud Software as a Cloud service (SaaS): The capability provided to the consumer is to use the provider's applications running on a Cloud infrastructure. The applications are accessible from various client devices through a thin client interface such as a web browser (e.g., web-based email). The consumer does not manage or control the underlying Cloud infrastructure including network, servers, operating systems, storage, or even individual application capabilities, with the possible exception of limited user-specific application configuration settings.

Cloud Platform as a Cloud service (PaaS): The capability provided to the consumer is to deploy onto the Cloud infrastructure consumer-created or acquired applications created using programming languages and tools supported by the provider. The consumer does not manage or control the underlying Cloud infrastructure including network, servers, operating systems, or storage, but has control over the deployed applications and possibly application hosting environment configurations.

Cloud Infrastructure as a Cloud service (IaaS): The capability provided to the consumer is to provision processing, storage, networks, and other fundamental computing resources where the consumer is able to deploy and run arbitrary software, which can include operating systems and applications. The consumer does not manage or control the underlying Cloud infrastructure but has control over operating systems, storage, deployed applications, and possibly limited control of select networking components (e.g., host firewalls).

Deployment Models are as follows:

Private Cloud: The Cloud infrastructure is operated solely for an organization. It may be managed by the organization or a third party and may exist on premise or off premise.

Community Cloud: The Cloud infrastructure is shared by several organizations and supports a specific community that has shared concerns (e.g., mission, security requirements, policy, and compliance considerations). It may be managed by the organizations or a third party and may exist on premise or off premise.

Public Cloud: The Cloud infrastructure is made available to the general public or a large industry group and is owned by an organization selling Cloud services.

Hybrid Cloud: The Cloud infrastructure is a composition of two or more Clouds (private, community, or public) that remain unique entities but are bound together by standardized or proprietary technology that enables data and application portability (e.g., Cloud bursting for load-balancing between Clouds).

Cloud software takes full advantage of the Cloud paradigm by being service oriented with a focus on statelessness, low coupling, modularity, and semantic interoperability.

II. Implementation of the Present Invention

As indicated above, this disclosure describes a system and method for the dynamic generation and maintenance of a Cloud services catalog using a Cloud bus. The Cloud bus allows for multiple disparate services, offered by different partners, across unrelated, physically distinct Clouds to be presented as an index of integrated services.

Among other things, the present invention allows for Cloud providers to: provide a method to establish and mandate a minimum set of attributes required to interoperate with other Cloud services; provide a method to manage the dynamic nature of a Cloud computing environment such that the Cloud services bus can be used to manage the constantly changing nature of Cloud resources and offered services; provide a method to manage and represent constantly changing service levels associated with available Cloud services; provide a method to allow third party Cloud partners (or Cloud brokers) to create new service catalog entries implemented by multiple back-end Cloud providers.

Today, Cloud providers exist in singular domains and are focusing on providing a given resource, such as access to computers, computer storage, business applications, etc. To provide these Cloud capabilities to its customers, the Cloud providers need to invest money, time, and energy in building out the IT infrastructure to meet the expected demands from its clients. If they over-build, they diminish their return on capital investment and if they under-build, they lose the opportunity to capture growth. Being able to meet the demands that emerge without comprising the return on their capital investments will help them become profitable enterprises. To be able to execute on this approach requires a system and method for collecting, advertising and maintaining Cloud services provided by an integration of disparate Cloud computing environments.

This is accomplished through a Cloud services bus that advertises available services to Cloud customers, including services provided by multiple Cloud providers. This manifestation of a Cloud services catalog enables creation of 'composite' Cloud services. Overall, this invention provides a novel way for efficiently satisfying dynamic resource demands that occur within a Cloud environment, leveraging services offered by multiple Cloud partners across distinct provider Clouds.

Referring now to FIG. 1, a schematic of an exemplary Cloud computing node is shown. Cloud computing node 10 is only one example of a suitable Cloud computing node and is not intended to suggest any limitation as to the scope of use or functionality of the invention described herein. Regardless, Cloud computing node 10 is capable of being implemented and/or performing any of the functions set forth in section I above.

In Cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed Cloud computing environments that include any of the above systems or devices, and the like.

Computer system/server 12 may be described in the general context of computer system-executable instructions, such as program modules, being executed by a computer system. Generally, program modules include routines, programs, objects, components, logic, data structures, and so on that perform particular tasks or implement particular abstract data types. The exemplary computer system/server 12 may be practiced in distributed Cloud computing environments where tasks are performed by remote processing devices that are linked through a communications network. In a distributed Cloud computing environment, program modules may be located in both local and remote computer system storage media including memory storage devices.

As shown in FIG. 1, computer system/server 12 in Cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, a storage system 34 can be provided for reading from and writing to a non-removable, non-volatile magnetic media (not shown and typically called a "hard drive"). Although not shown a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of the invention.

Program/utility 40 having a set (at least one) of program modules 42 may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
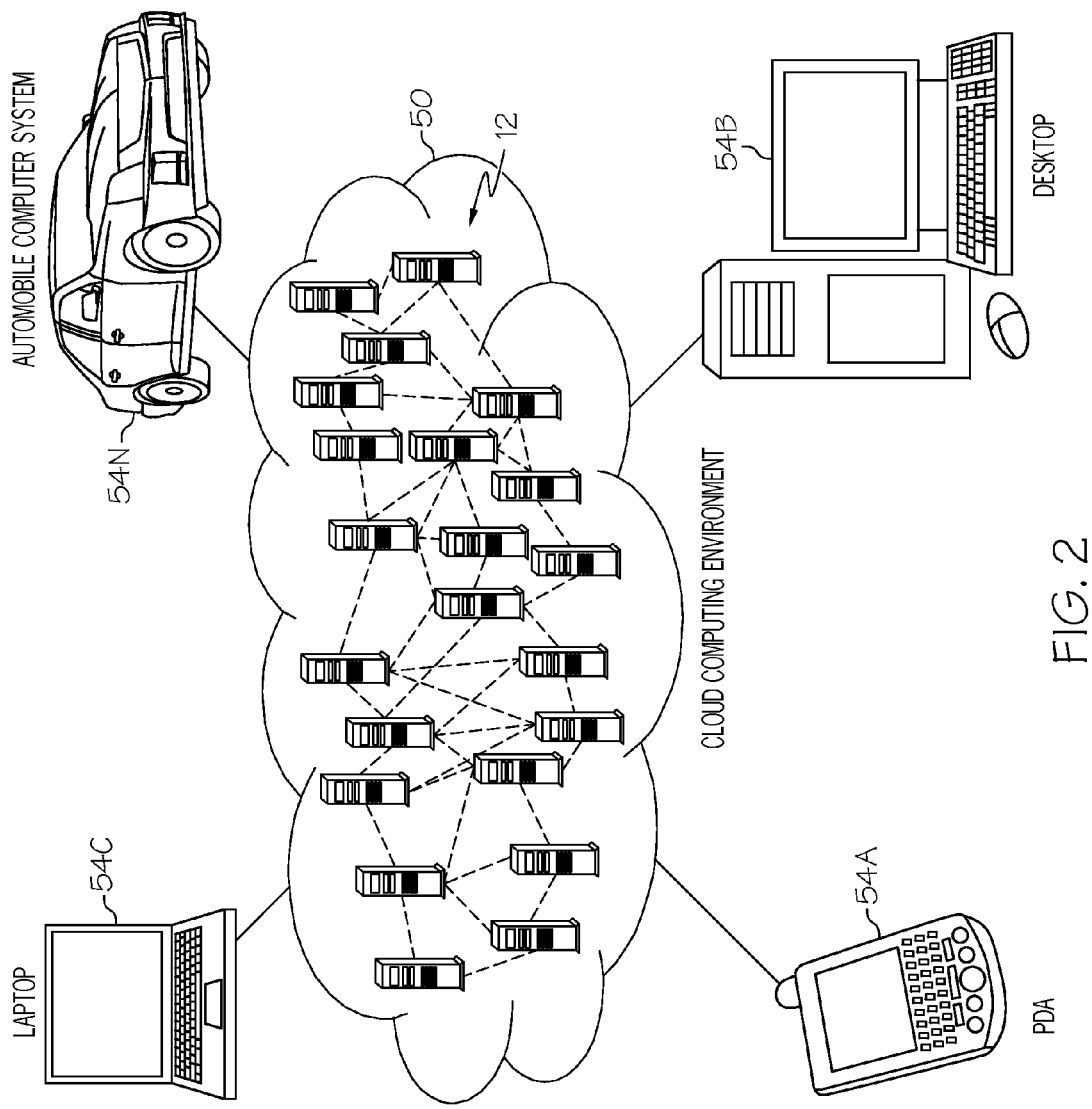
FIG. 2 shows a Cloud computing environment according to the present invention.

Referring now to FIG. 2, illustrative Cloud computing environment 50 is depicted. As shown, Cloud computing environment 50 comprises one or more Cloud computing nodes 10 with which computing devices such as, for example, personal digital assistant (PDA) or cellular telephone 54A, desktop computer 54B, laptop computer 54C, and/or automobile computer system 54N communicate. This allows for infrastructure, platforms and/or software to be offered as services (as described above in Section I) from Cloud computing environment 50 so as to not require each client to separately maintain such resources. It is understood that the types of computing devices 54A-N shown in FIG. 2 are intended to be illustrative only and that Cloud computing environment 50 can communicate with any type of computerized device over any type of network and/or network/addressable connection (e.g., using a web browser).

Figure 3:
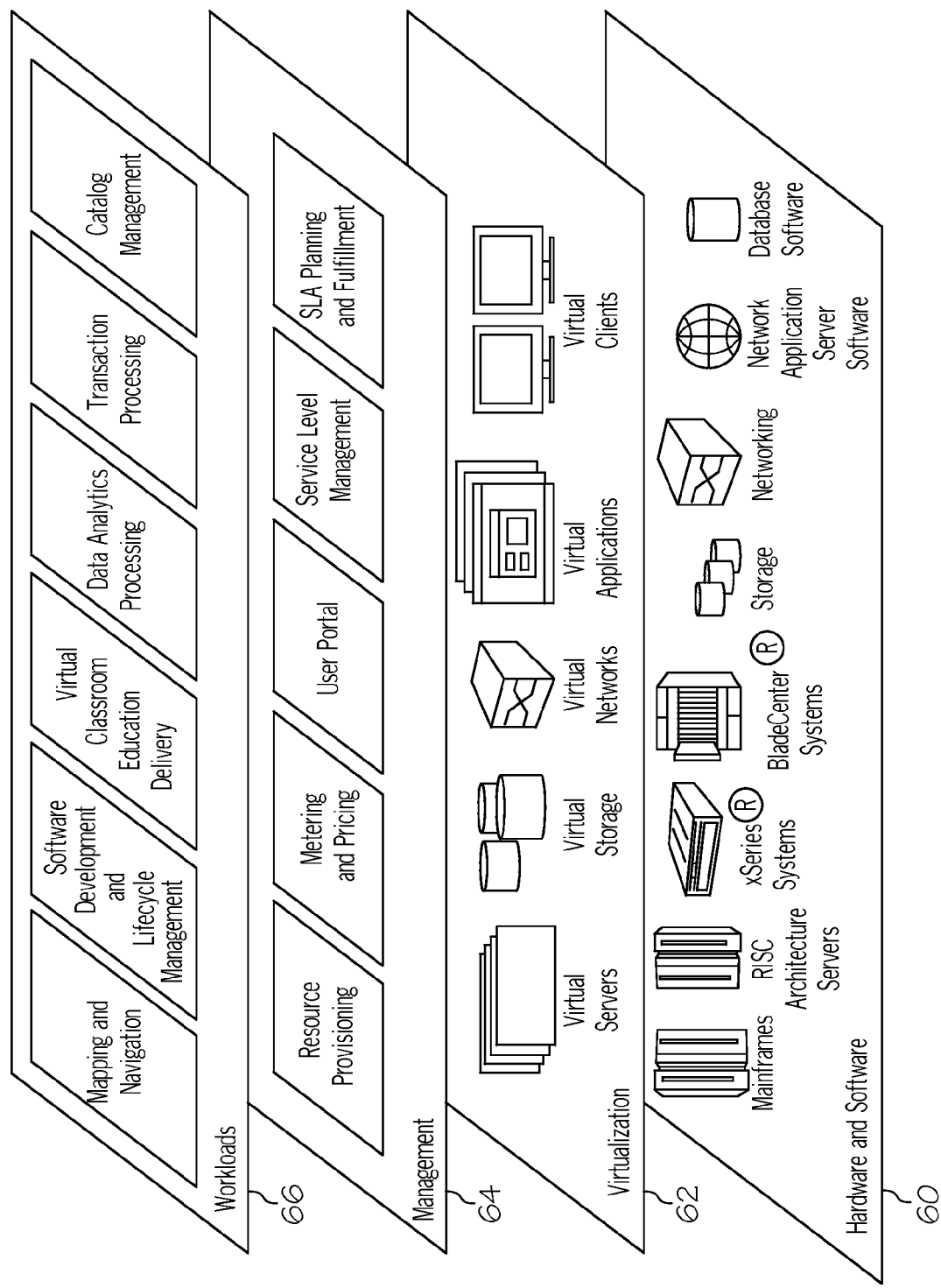
FIG. 3 shows Cloud abstraction model layers according to the present invention.

Referring now to FIG. 3, a set of functional abstraction layers provided by Cloud computing environment 50 (FIG. 2) is shown. It should be understood in advance that the components, layers, and functions shown in FIG. 3 are intended to be illustrative only and the invention is not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation in the United States, other countries, or both.)

Virtualization layer 62 provides an abstraction layer from which the following exemplary virtual entities may be provided: virtual servers; virtual storage; virtual networks, including virtual private networks; virtual applications; and virtual clients.

Management layer 64 provides the exemplary functions described below. Resource provisioning provides dynamic procurement of computing resources and other resources that are utilized to perform tasks within the Cloud computing environment. Metering and Pricing provide cost tracking as resources are utilized within the Cloud computing environment, and billing or invoicing for consumption of these resources. In one example, these resources may comprise application software licenses. Security provides identity verification for users and tasks, as well as protection for data and other resources. User portal provides access to the Cloud computing environment for both users and system administrators. Service level management provides Cloud computing resource allocation and management such that required service levels are met. Service Level Agreement (SLA) planning and fulfillment provides pre-arrangement for, and procurement of, Cloud computing resources for which a future requirement is anticipated in accordance with an SLA.

Workloads layer 66 provides functionality for which the Cloud computing environment is utilized. Examples of workloads and functions which may be provided from this layer include: mapping and navigation; software development and lifecycle management; virtual classroom education delivery; data analytics processing; transaction processing, and Cloud services catalog management.

In general, Cloud services catalog management functionality implements the functions of the present invention as discussed herein in conjunction with FIGS. 4-7. As mentioned above, the present invention uses a Cloud services bus to collect, advertise and maintain Cloud services provided by an integration of disparate Cloud computing environments in a Cloud services catalog.

The Cloud services catalog will describe the types of Cloud services, attributes and interface definitions of the Cloud service, and additional Cloud service characteristics, including (but not limited) to SLO/SLA, known capacity limits, redundancy indicator (low, medium, high), platform level(s), and security requirements. Service Level Objectives (SLOs) are specific measurable characteristics of the SLA such as availability, throughput, frequency, response time, or quality. The Cloud services housed in the Cloud services catalog are collected, advertised and maintained using a Cloud services bus.

Figure 4:
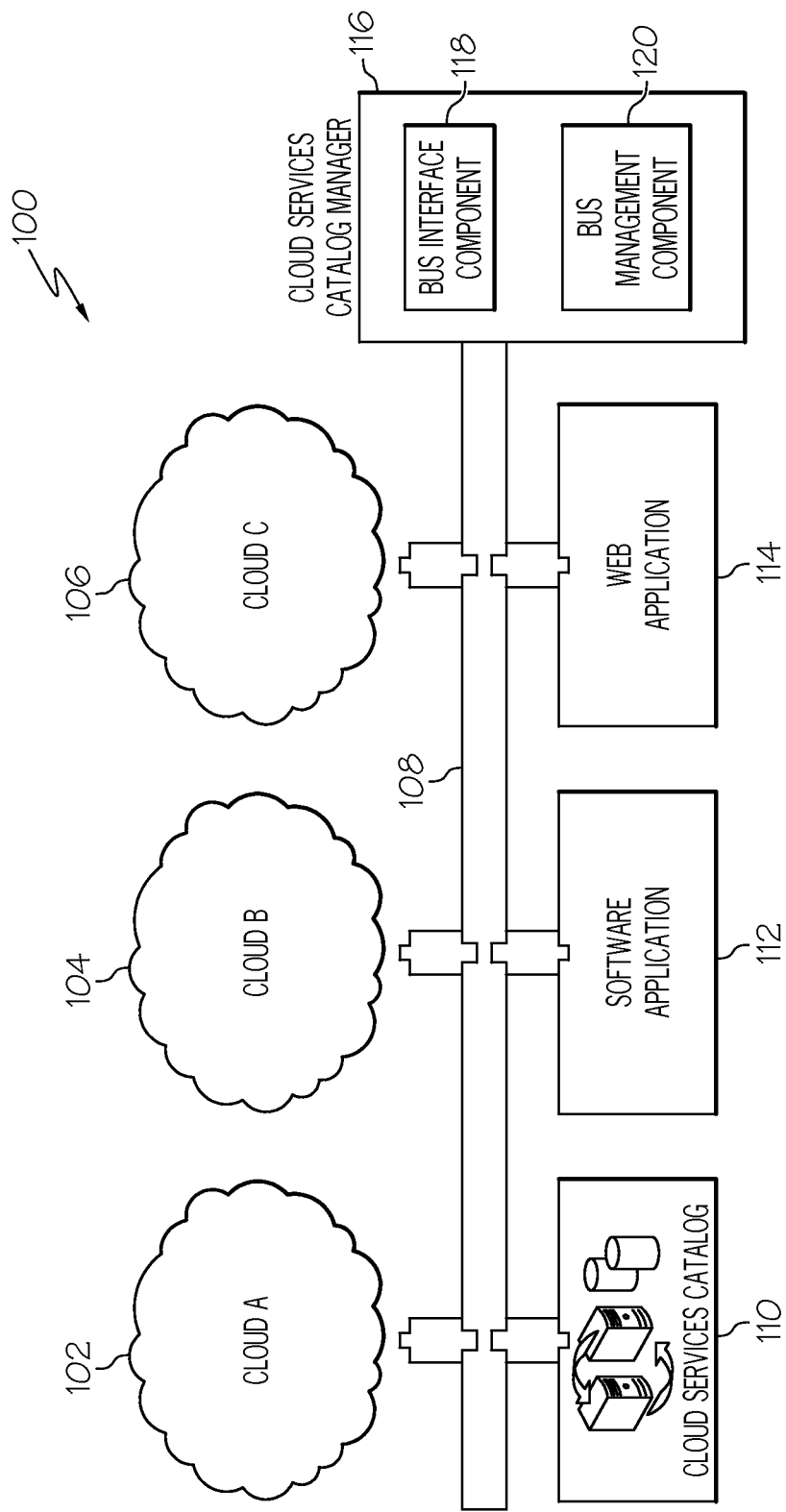
FIG. 4 shows an illustrative example of Cloud services bus according to the present invention.

Referring now to FIG. 4, the diagram shows an exemplary logical architecture 100 including Cloud services catalog 110. In this example, three Cloud providers (Cloud A 102, Cloud B 104, Cloud C 106) are both partners and members of the cross-provider Cloud services bus. Each Cloud provider utilizes both internal and external resources to create a set of Cloud services that the provider wishes to offer customers. The Cloud services may be storage services, network services, business services, etc. This view exposes the separate Cloud infrastructures connected through Cloud services communications bus 108 having a cloud services catalog manager 116 including bus management component 120 configured to support the definition and management of Cloud services catalog 110. Each Cloud provider communicates through Cloud services communications bus 108 to advertise the provider's Cloud services using Cloud services catalog 110. Bus interface component 118 collects attributes and interface definitions based on service classification required to insert new services into Cloud services catalog 110.

A common framework for service advertisement using Cloud service catalog manager 116 allows Cloud service owners (partners) to quickly insert new or updated services at varied maturity levels. Maturity includes the designation of service availability (test, development, production), SLO/SLA, and the relative scalability of the solution. Customers can apply their use cases, drawing on Cloud services catalog 110 to select the combination of services/ensembles that most closely align with their requirements for processing, availability and cost. A Cloud services partner needs a means of establishing and maintaining the services he offers within a provider Cloud, such that, Cloud customers can interrogate Cloud services catalog 110 to create a processing itinerary. Functionally, catalog administration will allow the partner to introduce their services as pluggable components in the Cloud computing environment.

Figure 5:
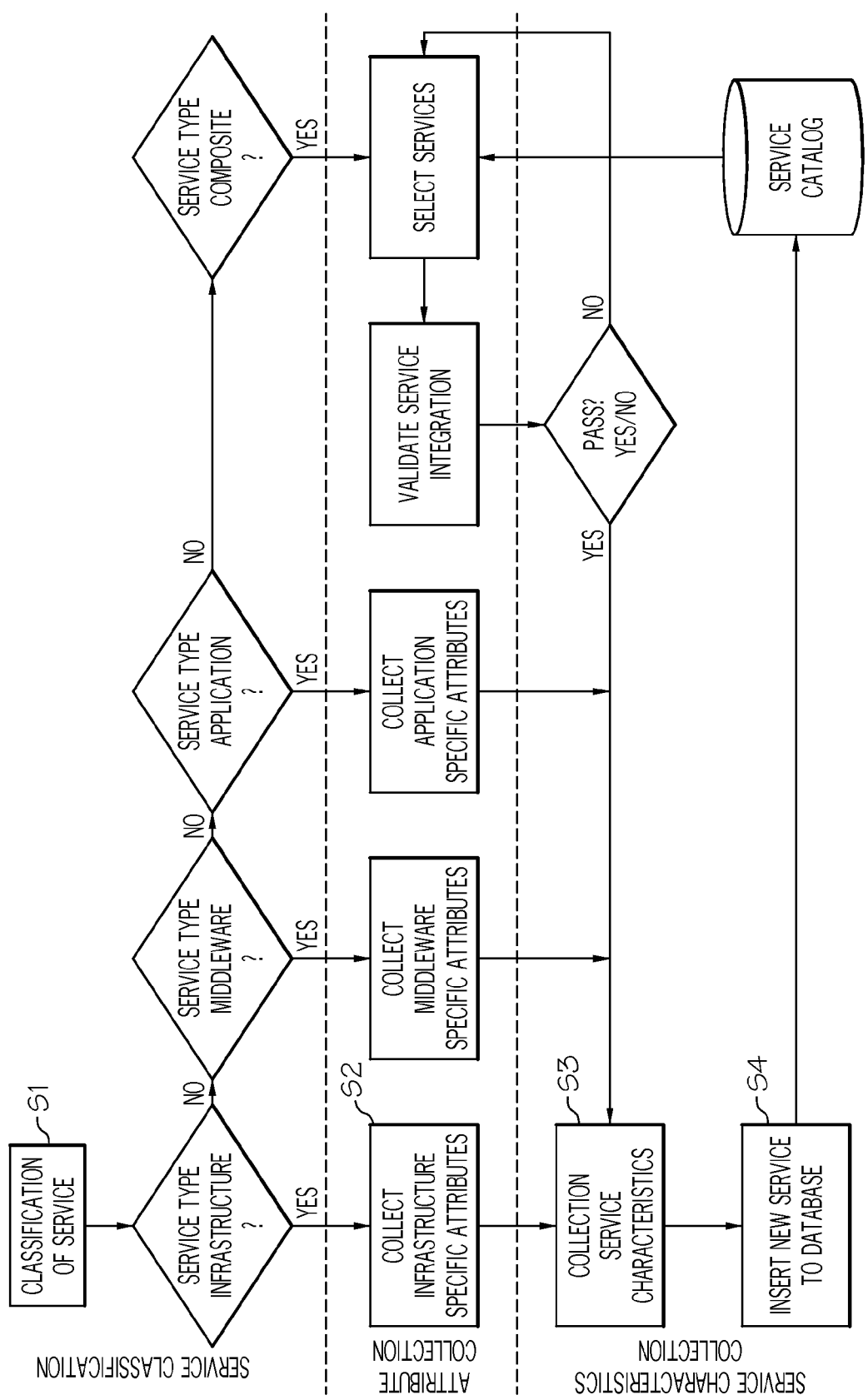
FIG. 5 shows a flow diagram of a method for inserting service entries into the Cloud services catalog according to the present invention.

FIG. 5 depicts the method of inserting a new Cloud service into the Cloud services catalog 110, registering the Cloud service and establishing its state within the Cloud. In step S1, when a request is issued for a new Cloud service, the new service is classified against predefined categories (for example: infrastructure service, middleware service, application service) to determine how close the new service is to currently offered services. In step S2, Cloud services catalog manager 116 collects attributes and interface definitions based on service classification required to integrate components into composite services. To accomplish this, descriptive information and key words to support itinerary building may be collected. In step S3, Cloud services catalog manager 116 then collects additional service characteristics, including but not limited to: SLO/SLA, know capacity limits, redundancy indicator (low, medium, high), platform level(s), and security requirements to support itinerary building. Cloud services catalog 110 provides service building blocks that can be dynamically assembled by cloud partners or customers to form composites cloud services. Finally, in step S4, the new Cloud service is established within the Cloud services catalog 110. The state and availability of a Cloud service is defined complete with test, development and production characteristics.

Referring back to FIG. 4, consider the example of a customer, subscribed to one or more services advertised in Cloud services catalog 110, wishes to execute web application 114. The customer initially looks at the Cloud service catalog 110 to determine whether the web application service is available. If the service is indeed in the catalog, the customer requests the service. If the service is not available in the catalog, the customer is able to post a 'request for service' into the service catalog. In this example, there is a requirement for both computing and storage resources to execute web application 114. Each Cloud contains a services registry detailing the resources provided by the cloud. Cloud services catalog manager 116 reads each Cloud's services registry and determines Cloud A 102 provides the computing resources, while Cloud B 104 provides the storage resources. In this example, both provider Clouds integrate their services to create a new service in Cloud services catalog 110.

In another embodiment, the customer may establish customer's own composite services by selecting from services available in the Cloud services catalog. This functionality is possible because participating partners are required to enter minimum mandatory attribute information during service registration. These attributes optimize the self-service experience and minimize the required interaction required between providers, partners, and customers.

In another embodiment, a Cloud partner may have application service the Cloud partner wishes to make available.

The Cloud partner uses the catalog to create a composite service thus only investing in the application development and footprint required to deploy the application. The Cloud partner bills subsequent use of the application, leveraging the services infrastructure published by other partners. The Cloud partner generates revenue for the Cloud partner, other partners, and provides for one-stop shopping for customers.

In another embodiment, consider the ability for the Cloud service bus to allow a third party integrator to offer his or her own Cloud services, wholly provided by partner Clouds. Consider a services broker as an entity that offers not Cloud services of the broker's own, similar to a mortgage broker offering mortgages on behalf of multiple banks. However, the Cloud broker offers software application 112 by utilizing existing services provided by the partner Clouds to create a new, unique composite service. Software application 112 is implemented through the use of multiple backend Cloud providers. Cloud services catalog manager 116 provides the unique functionality for the Cloud broker to offer software application 112 in Cloud services catalog 110 that can be used by other customers.

Figure 6:
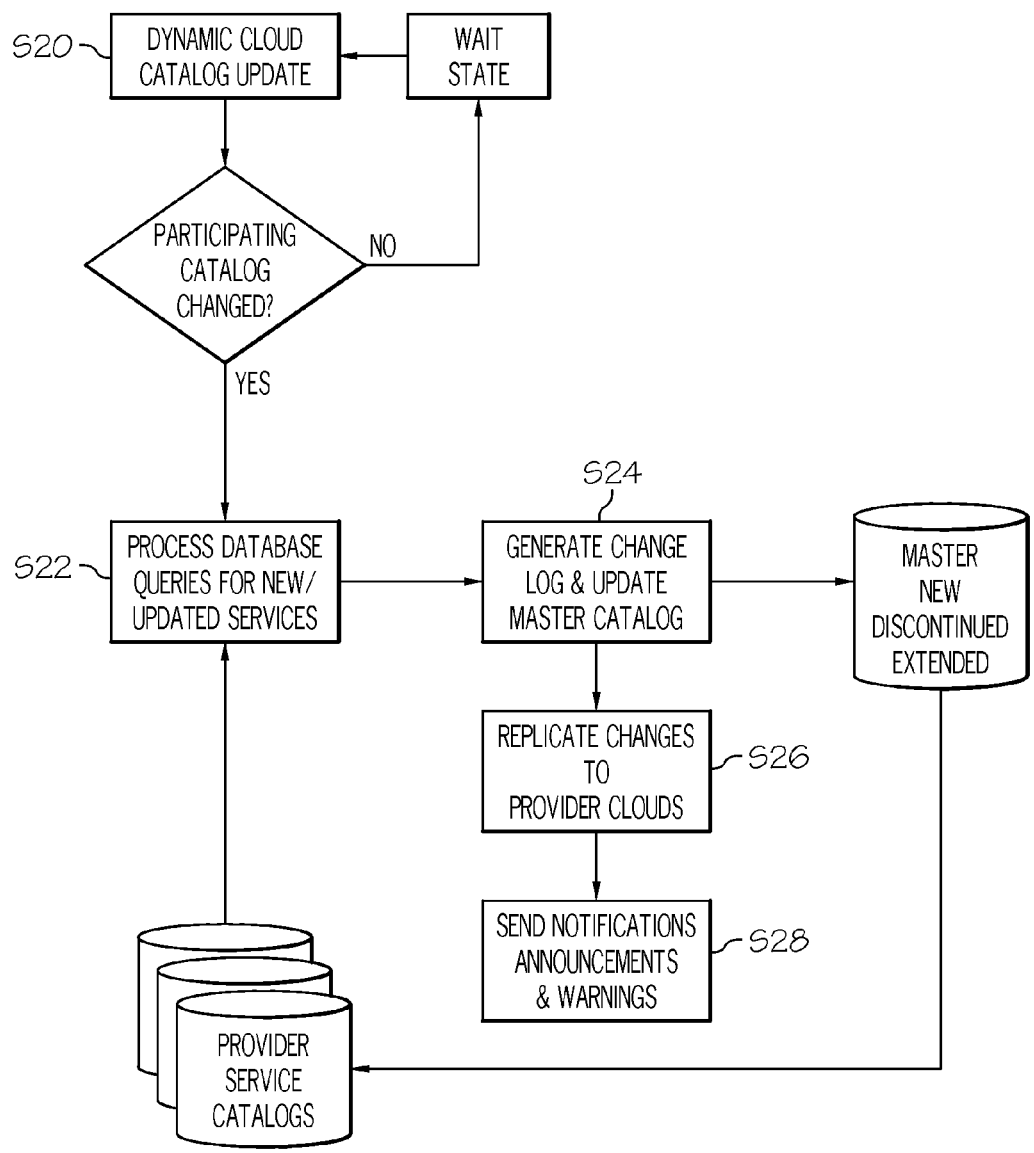
FIG. 6 shows a flow diagram of a method for synchronizing the participant Cloud catalogs according to the present invention.

Referring now to FIG. 6, a method flow diagram for the synchronization of participating Cloud registries is shown. In step S20, when a Cloud partner introduces a change to a Cloud service, all participant provider Cloud service catalogs must be updated. A service update may include any modification to an existing Cloud service or the addition of a new service. Each participating Cloud contains a Cloud services catalog detailing the available resources within the Cloud. In step S22, the Cloud services catalog housing the new or updated service is updated. In step S24, a change log is generated and the master catalog is updated. In step S26, the changes are replicated to the sister provider Clouds within the environment. In step S28, notification of changes is disseminated to partners and subscribing customers.

Figure 7:
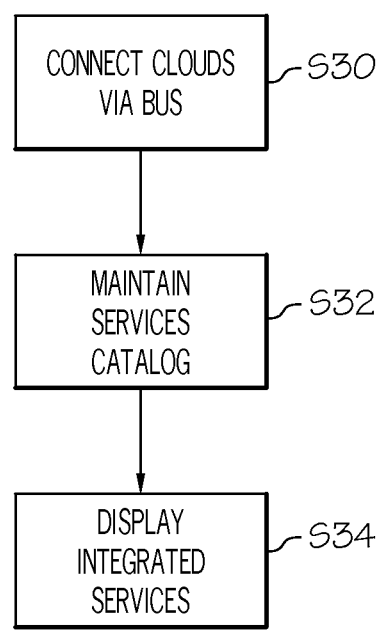
FIG. 7 shows a flow diagram of a method according the present invention.

Referring now to FIG. 7, a method flow diagram according to the present invention is shown. As shown, in step S30, the plurality of Clouds within the Cloud computing environment are connected via Cloud services communications bus 108. In step S32, Cloud services catalog 110 is maintained using Cloud services catalog manager 116. In step S34, bus interface component 118 displays an index of the integrated services on a user interface.

While shown and described herein as an inter-Cloud resource provisioning/management solution, it is understood that the invention further provides various alternative embodiments. For example, in one embodiment, the invention provides a computer-readable/useable medium that includes computer program code to enable a computer infrastructure to provide inter-Cloud resource provisioning/management functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a method that performs the process of the invention on a subscription, advertising, and/or fee basis. That is, a Cloud service provider, such as a Solution Integrator, could offer to provide inter-Cloud resource provisioning/management functionality. In this case, the service provider can create, maintain, support, etc., a computer infrastructure, such as computer system 102 (FIG. 1) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for providing inter-Cloud resource provisioning/management functionality. In this case, a computer infrastructure, such as computer system 102 (FIG. 1), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 102 (FIG. 1), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for provisioning services from a plurality of Clouds in a Cloud computing environment, comprising:
   connecting the plurality of Clouds in the Cloud computing environment using a Cloud services bus, the Cloud services bus comprising a Cloud services catalog manager;
   maintaining, via the Cloud services catalog manager, a catalog of integrated Cloud services from the plurality of connected Clouds using the Cloud services bus;
   displaying an index of the integrated Cloud services on a user interface, the integrated Cloud services comprising individual Cloud services and composite Cloud services, wherein the composite Cloud services comprise Cloud services from the plurality of connected Clouds, the composite Cloud services being composed by a Cloud services broker;
   receiving a notification of a change to at least one of the plurality of connected Clouds, the change comprising at least one of a modification to an existing Cloud service and an addition of a new Cloud service;
   updating, based on the change, a Cloud services registry associated with the at least one of the plurality of Clouds;
   updating, based on the change, the catalog of integrated Cloud services; and
   replicating the change to the plurality of connected Clouds.

2. The method of claim 1, wherein the Cloud services broker is an entity other than the Cloud services catalog manager.

3. The method of claim 1, further comprising:
   determining a service does not exist in the catalog;
   collecting characteristics of the service needed to establish the service in the catalog; and
   inserting an entry for the service into the catalog based on the characteristics.

4. The method of claim 3, the collecting comprising accepting characteristics of the service as input using a user interface.

5. The method of claim 3, the collecting comprising accessing at least two existing services stored in the catalog to create the non-existent service by integrating the existing services.

6. The method of claim 1, further comprising monitoring the characteristics of each service stored in the catalog; when at least one characteristic of at least one service changes, updating the catalog.

7. A Cloud services catalog manager for provisioning services from a plurality of Clouds in a Cloud computing environment, comprising;
   a memory medium comprising instructions;
   a bus coupled to the memory medium; and
   a processor coupled to the bus that when executing the instructions causes the Cloud manager to:
      connect the plurality of Clouds in the Cloud computing environment using a Cloud services bus, the Cloud services bus comprising a Cloud services catalog manager;
      maintain, via the Cloud services catalog manager, a catalog of integrated Cloud services from the plurality of connected Clouds using the Cloud services bus;
      display an index of the integrated services on a user interface, the integrated Cloud services comprising individual Cloud services and composite Cloud services, wherein the composite Cloud services comprise Cloud services from the plurality of connected Clouds, the composite Cloud services being composed by a Cloud services broker;
      receive a notification of a change to at least one of the plurality of connected Clouds, the change comprising at least one of a modification to an existing Cloud service and an addition of a new Cloud service;
      update, based on the change, a Cloud services registry associated with the at least one of the plurality of connected Clouds;
      update, based on the change, the catalog of integrated Cloud services; and
      replicate the change to the plurality of Clouds.

8. The Cloud services catalog manager of claim 7, wherein the Cloud services broker is an entity other than the Cloud services catalog manager.

9. The Cloud services catalog manager of claim 7, the Cloud services catalog manager being further caused to:
   determine a service does not exist in the catalog;
   collect characteristics of the service needed to establish the service in the catalog; and
   insert an entry for the service into the catalog based on the characteristics.

10. The Cloud services catalog manager of claim 9, the collecting requirement comprising accepting characteristics of the service as input using a user interface.

11. The Cloud services catalog manager of claim 9 the collecting requirement comprising accessing at least two existing services stored in the catalog to create the non-existent service by integrating the existing services.

12. The Cloud services catalog manager of claim 7, the Cloud services catalog manager being further caused to monitor the characteristics of each service stored in the catalog; when at least one characteristic of at least one service changes, updating the catalog.

13. A non-transitory computer readable device containing a program product for provisioning services from a plurality of Clouds in a Cloud computing environment, the non-transitory computer readable device comprising program code for causing a computer system to:
   connect the plurality of Clouds in the Cloud computing environment using a Cloud services bus;
   maintain, via the Cloud services catalog manager, a catalog of integrated Cloud services from the plurality of connected Clouds using the Cloud services bus, the Cloud services bus comprising a Cloud services catalog manager;
   display an index of the integrated Cloud services on a user interface, the integrated Cloud services comprising individual Cloud services and composite Cloud services, wherein the composite Cloud services comprise Cloud services from the plurality of connected Clouds, the composite Cloud services being composed by a Cloud services broker;
   receive a notification of a change to at least one of the plurality of connected Clouds, the change comprising at least one of a modification to an existing Cloud service and an addition of a new Cloud service;
   update, based on the change, a Cloud services registry associated with the at least one of the plurality of connected Clouds;
   update, based on the change, the catalog of integrated Cloud services; and
   replicate the change to the plurality of Clouds.

14. The computer readable device containing the program product of claim 13, wherein the Cloud services broker is an entity other than the Cloud services catalog manager.

15. The computer readable device containing the program product of claim 13, the computer readable medium further comprising program code for causing the computer system to:
- determine a service does not exist in the catalog;
- collect characteristics of the service needed to establish the service in the catalog; and
- insert an entry for the service into the catalog based on the characteristics.

16. The computer readable device containing the program product of claim 15, the collecting requirement comprising accepting characteristics of the service as input using a user interface.

17. The computer readable device containing the program product of claim 15, the collecting comprising accessing at least two existing services stored in the catalog to create the non-existent service by integrating the existing services.

18. The computer readable device containing the program product of claim 13, the computer readable medium further comprising program code for causing the computer system to monitor the characteristics of each service stored in the catalog; when at least one characteristic of at least one service changes, updating the catalog.

19. A method for deploying a system for provisioning services from a plurality of Clouds in a Cloud computing environment, comprising:
providing a computer infrastructure being operable to:
- connect the plurality of Clouds in the Cloud computing environment using a Cloud services bus, the Cloud services bus comprising a Cloud services catalog manager;
- maintain, via the Cloud services catalog manager, a catalog of integrated Cloud services from the plurality of connected Clouds using the Cloud services bus;
- display an index of the integrated services on a user interface, the integrated Cloud services comprising individual Cloud services and composite Cloud services, wherein the composite Cloud services comprise Cloud services from the plurality of connected Clouds, the composite Cloud services being composed by a Cloud services broker;
- receive a notification of a change to at least one of the plurality of connected Clouds, the change comprising at least one of a modification to an existing Cloud service and an addition of a new Cloud service;
- update, based on the change, a Cloud services registry associated with the at least one of the plurality of connected Clouds;
- update, based on the change, the catalog of integrated Cloud services; and
- replicate the change to the plurality of Clouds other than the at least one of the plurality of Clouds.

20. The method of claim 19, the computer infrastructure further being operable to:
- determine a service does not exist in the catalog;
- collect characteristics of the service needed to establish the service in the catalog; and
- insert an entry for the service into the catalog based on the characteristics.

* * * * *